United States Patent
Piper et al.

(10) Patent No.: US 10,245,656 B2
(45) Date of Patent: Apr. 2, 2019

(54) STEP BIT

(71) Applicant: Greenlee Textron Inc., Rockford, IL (US)

(72) Inventors: Arthur Anton Piper, Loves Park, IL (US); John Jeremiah Morton, Chattanooga, TN (US); Nalin Devalam, Rockford, IL (US); Robert Bruce Bentley, Belvidere, IL (US)

(73) Assignee: GREENLEE TOOLS, INC., Rockford, IL (US)

( * ) Notice: Subject to any disclaimer, the term of this patent is extended or adjusted under 35 U.S.C. 154(b) by 0 days.

(21) Appl. No.: 15/661,118

(22) Filed: Jul. 27, 2017

(65) Prior Publication Data

US 2019/0030620 A1 Jan. 31, 2019

(51) Int. Cl.
*B23B 51/00* (2006.01)

(52) U.S. Cl.
CPC ............ *B23B 51/009* (2013.01); *B23B 51/00* (2013.01); *B23B 2251/282* (2013.01)

(58) Field of Classification Search
CPC ....... B23B 51/009; B23B 51/00; B23B 51/05; B23B 2251/282; B23B 2251/70; B23B 2251/40; B23B 2251/52
See application file for complete search history.

(56) References Cited

U.S. PATENT DOCUMENTS

| 499,098 | A | 6/1893 | Comstock |
| 2,610,530 | A | 9/1952 | Caliendo |
| 2,694,321 | A | 11/1954 | Riza |
| 3,559,514 | A | 2/1971 | Brownfield |
| 3,645,640 | A | 2/1972 | Zukas |
| 4,580,933 | A | 4/1986 | Wilkins |
| 4,582,458 | A * | 4/1986 | Korb ..................... B23B 51/009 408/224 |
| 5,174,692 | A | 12/1992 | Martin |
| 5,186,584 | A | 2/1993 | Muller et al. |
| 5,466,100 | A * | 11/1995 | Ahluwalia ............ B23B 31/005 408/224 |
| 7,150,589 | B2 | 12/2006 | Nordlin |

(Continued)

FOREIGN PATENT DOCUMENTS

| CN | 201151004 Y | 11/2008 |
| DE | 4010075 | 10/1991 |

(Continued)

OTHER PUBLICATIONS

Bit,Step 32,5MM (PKGD)—Greenlee—Faster, Safer, Easier® 783310360223, 2017, 1 pg.

(Continued)

*Primary Examiner* — Nicole N Ramos
(74) *Attorney, Agent, or Firm* — Klintworth & Rozenblat IP LLP

(57) ABSTRACT

A step bit according to some embodiments includes a body including one or more flutes having a cutting edge configured to cut a hole in a workpiece, and a plurality of steps provided on the body. The steps progressively increase in diameter from a first distal step to a terminal proximal step. One or more of the steps have first and second lands. An outer diameter of the first land is less than the outer diameter of the second land. A length of the first land is less than a length of the second land.

37 Claims, 9 Drawing Sheets

(56) References Cited

U.S. PATENT DOCUMENTS

| | | | |
|---|---|---|---|
| 7,278,806 B1 | 10/2007 | Clayton | |
| 8,029,215 B2 | 10/2011 | Gentry et al. | |
| 8,388,280 B1* | 3/2013 | Ison | B23B 51/0081 408/144 |
| 2004/0076483 A1* | 4/2004 | Singh | B23B 51/009 408/1 R |
| 2006/0140732 A1 | 6/2006 | Hecht et al. | |
| 2007/0264094 A1* | 11/2007 | Seeley | B23B 51/009 408/224 |
| 2008/0029311 A1 | 2/2008 | Seeley | |
| 2008/0166195 A1* | 7/2008 | Gentry | B23B 51/009 408/224 |
| 2010/0254779 A1 | 10/2010 | Wedner | |
| 2011/0164937 A1 | 7/2011 | Byrne et al. | |
| 2014/0363244 A1 | 12/2014 | Allen et al. | |
| 2014/0369776 A1 | 12/2014 | Durfee | |
| 2015/0093205 A1 | 4/2015 | Krenzer | |

FOREIGN PATENT DOCUMENTS

| | | |
|---|---|---|
| DE | 20303656 | 6/2003 |
| GB | 155004 | 12/1920 |
| JP | 200228811 | 1/2002 |
| JP | 200210312 | 4/2002 |

OTHER PUBLICATIONS

"Cutting-Edge Product Developments," EXACT GmbH & Co. KG Prazisionswerkzeuge, http://exact.info/english/stufenbohrer.php, 2014, 1 page.
Machine translation for DE 4010075.
Machine translation provided by the USPTO for JP 2002-028811.
Machine translation for JP 2002-103127.
Extended European Search Report for corresponding European Application No. 18185719.4 dated Dec. 6, 2018, 9 pages.
Machine translation for CN201151004Y.
Machine translation for DE20303656U1.

* cited by examiner

STEP BIT

FIELD OF THE DISCLOSURE

The present disclosure relates to a step bit configured to cut a hole in a workpiece.

BACKGROUND

Step bits are commonly used to form holes in a workpiece, such as sheet metal, for use in an electrical panel. It is well-known that the larger the diameter that the step bit is, the slower the speed the operator needs to operate the drill. The torque of the cutting action increases significantly as larger diameter holes are created.

SUMMARY

A step bit according to some embodiments includes a body including one or more flutes having a cutting edge configured to cut a hole in a workpiece, and a plurality of steps provided on the body. The steps progressively increase in diameter from a first distal step to a terminal proximal step. One or more of the steps have first and second lands. An outer diameter of the first land is less than the outer diameter of the second land. A length of the first land is less than a length of the second land.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
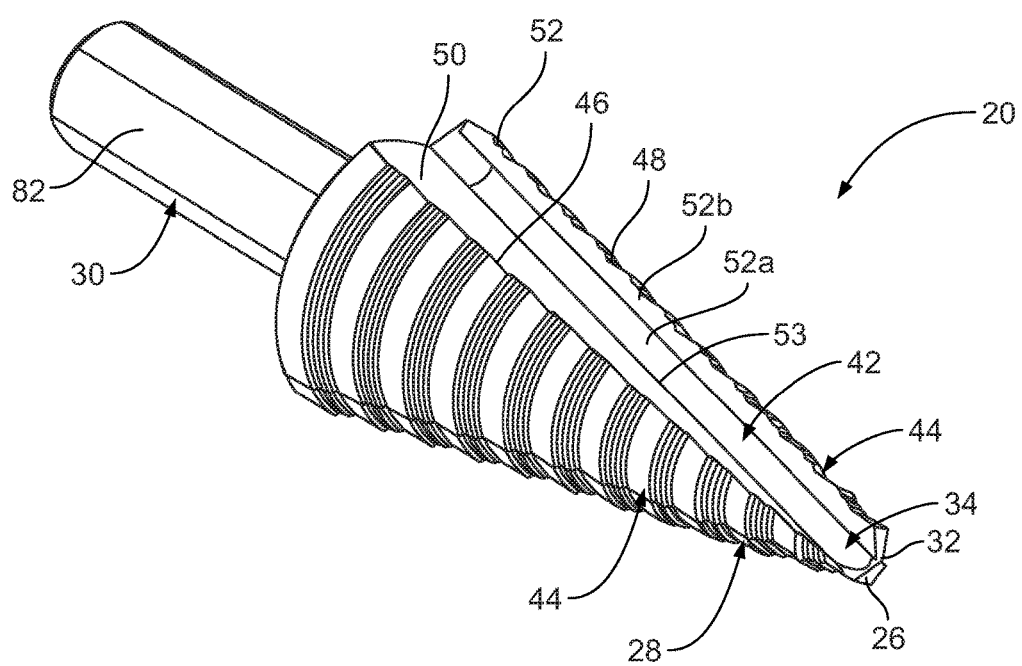
FIG. 1 is a perspective view of a step bit in accordance with an embodiment of the disclosure.
Figure 2:
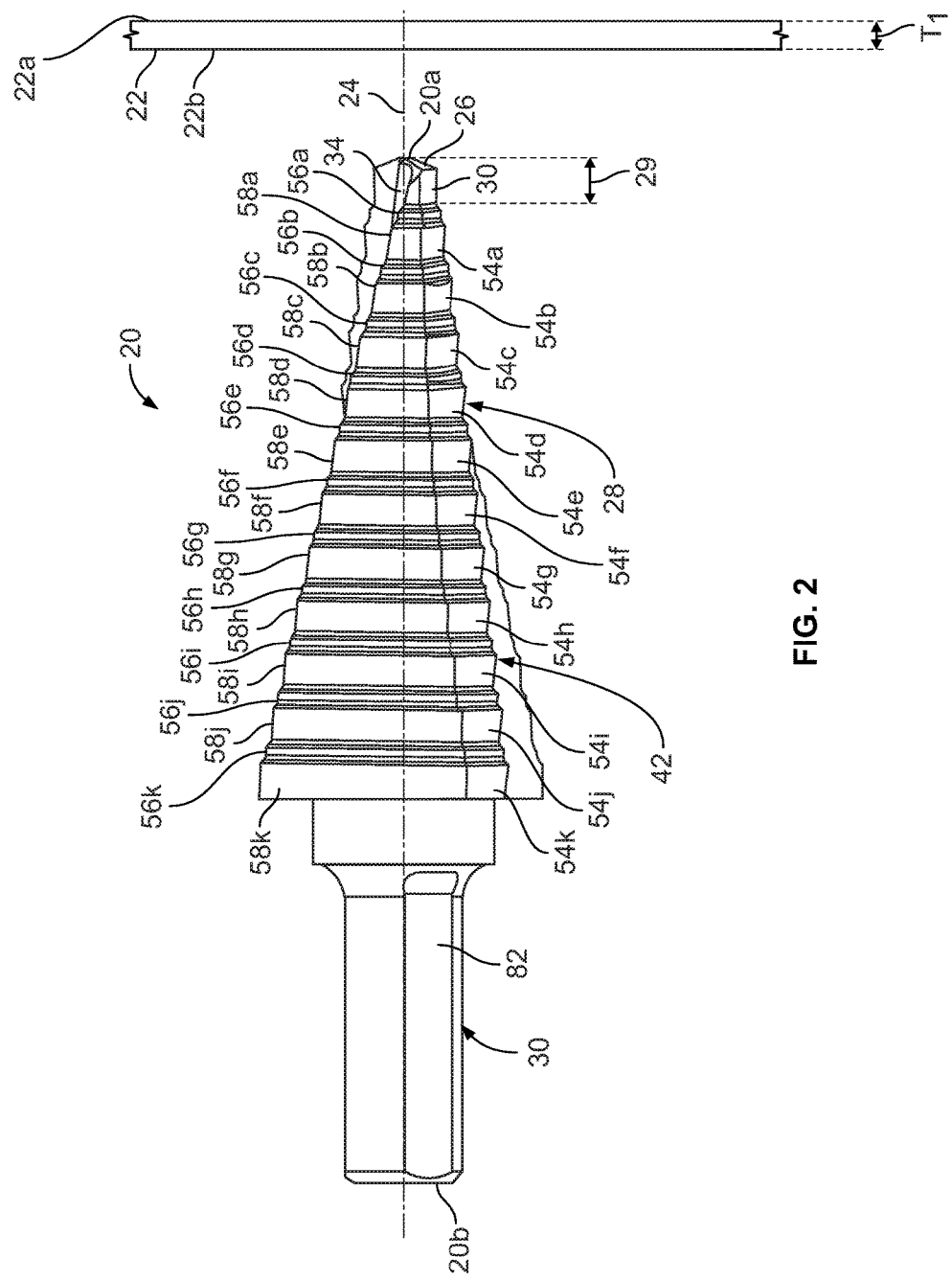
FIG. 2 is a side elevation view of the step bit, and showing a side elevation view of a workpiece exploded therefrom.
Figure 3:
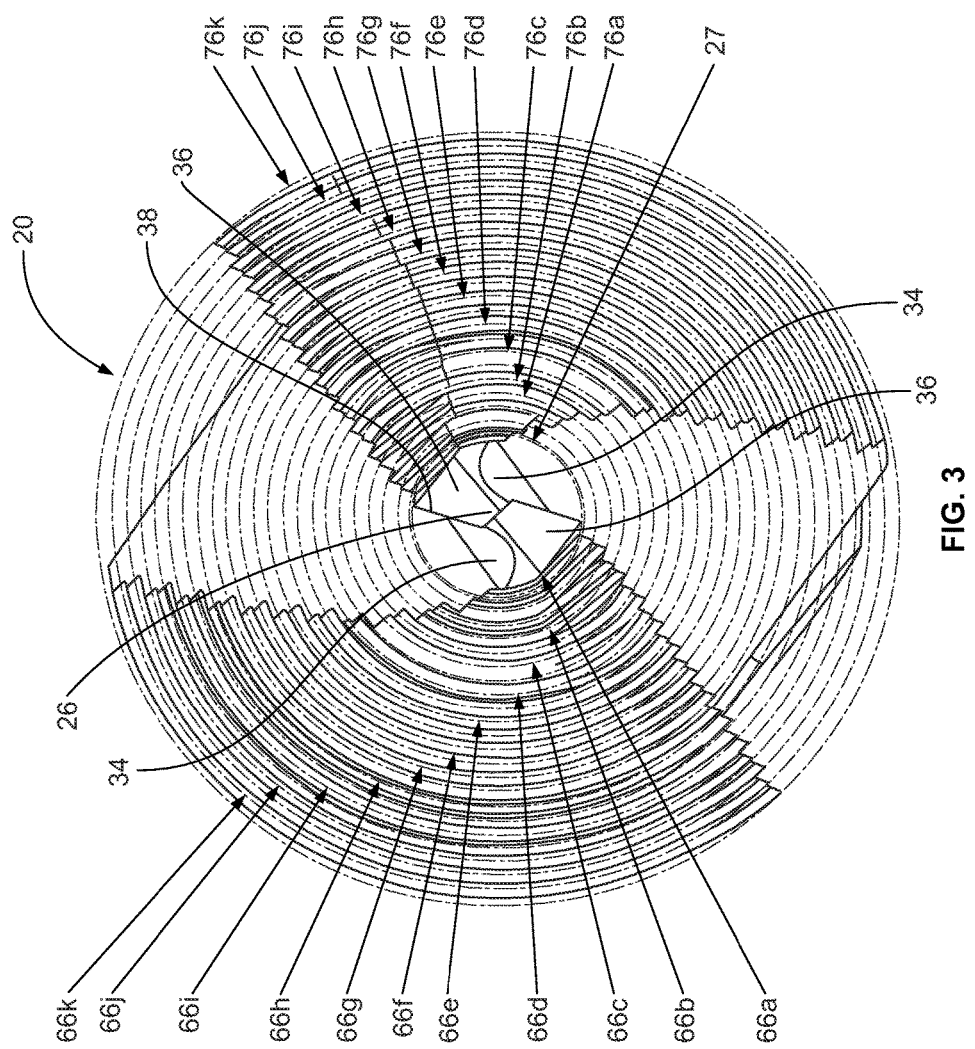
FIG. 3 is an end elevation view of the step bit, looking at the step bit from the distal end.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

A step bit 20, 120 which is configured to be mounted within the chuck of a power tool (not shown), such as an electric drill, is used to cut a hole in a workpiece 22, such as a 14-gauge sheet metal plate. The workpiece 22 has a maximum thickness T1 which is defined between a distal surface proximal surface 22b and a distal surface 22a. In an embodiment, the workpiece 22 has a maximum thickness T1 of 5/64 inches.

Figure 8:
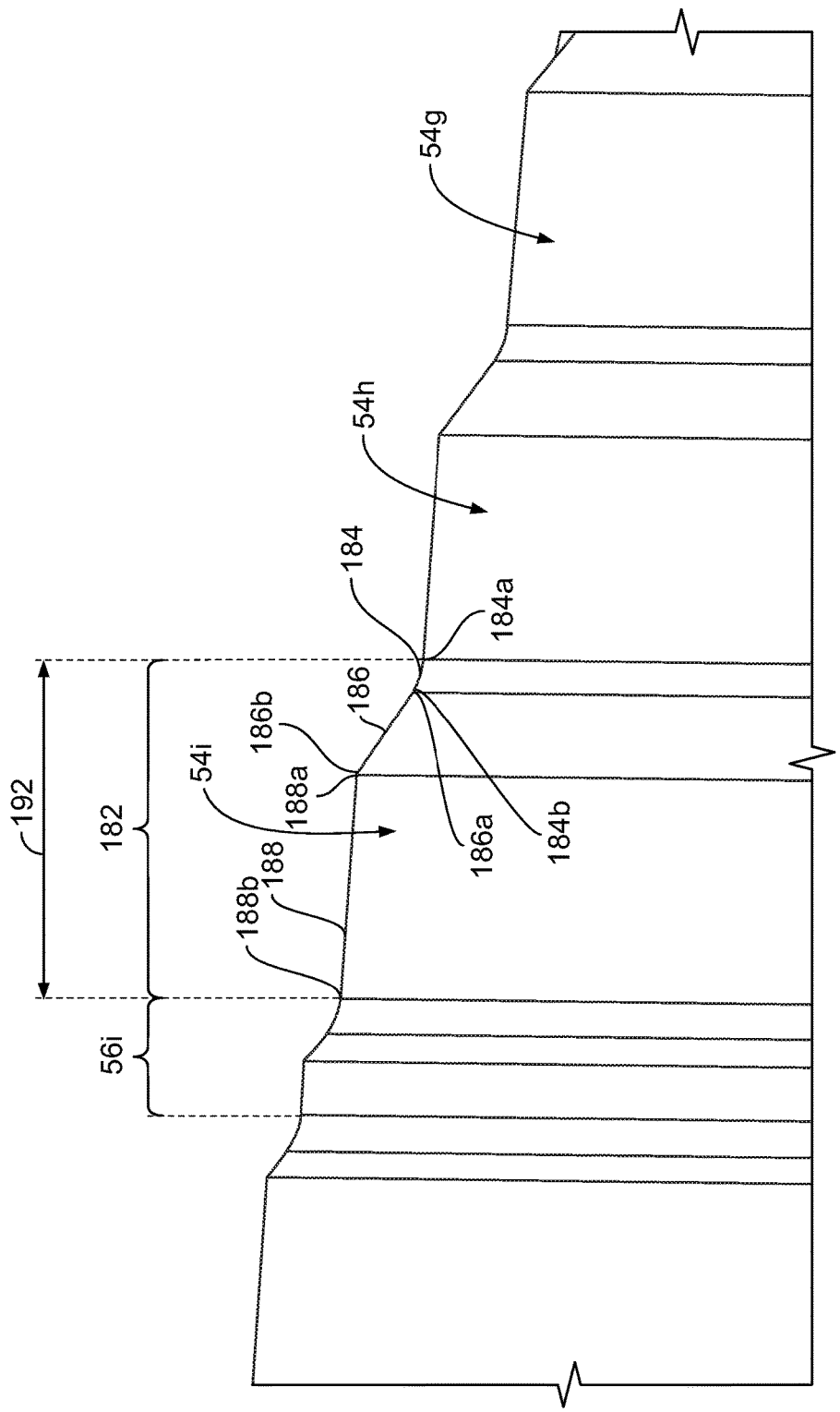
FIG. 8 is an enlarged partial side elevation view of the step bit of FIG. 5.
Figure 9:
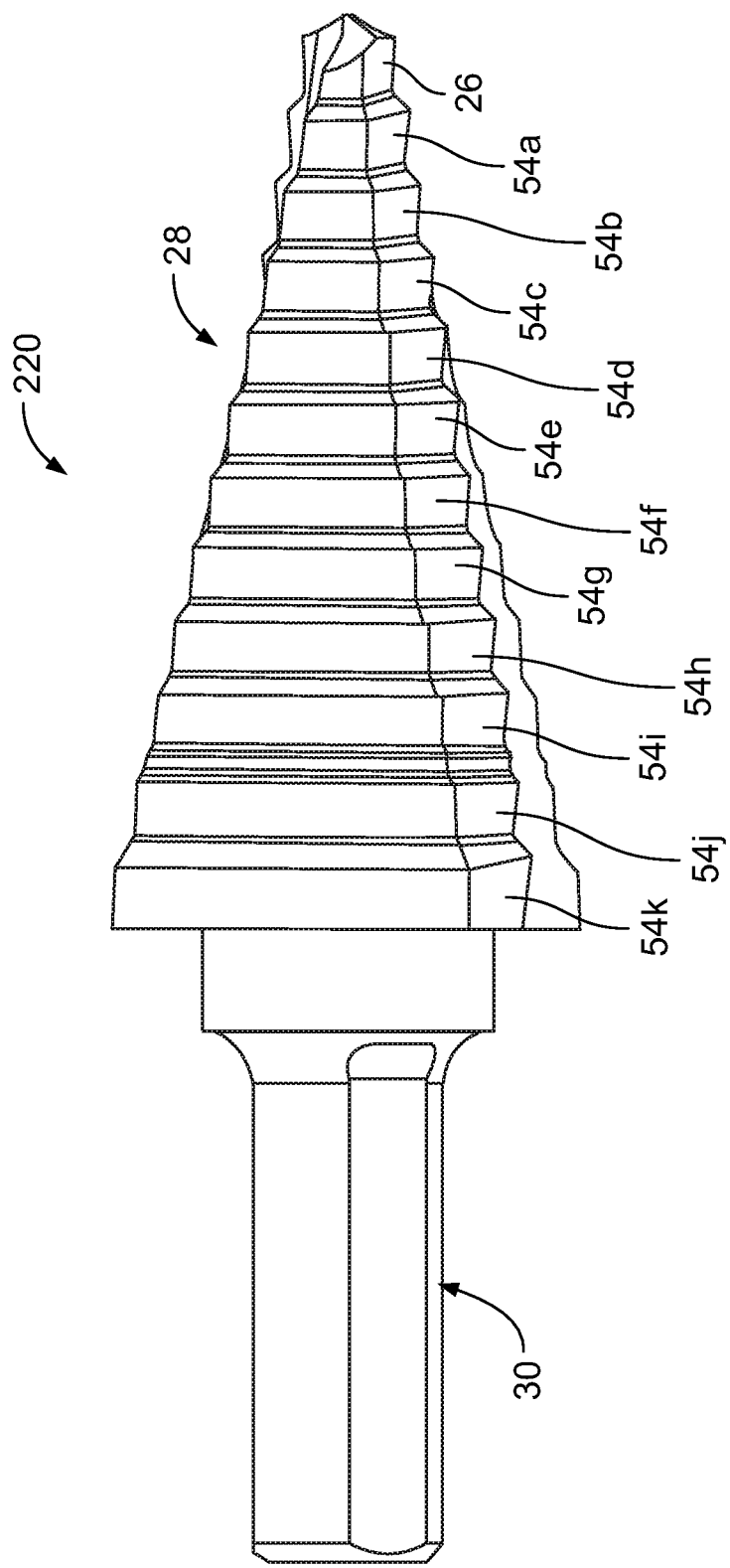
FIG. 9 is a side elevation view of a step bit in accordance with an alternate embodiment of the disclosure.

Embodiments of the step bit 20 are shown in FIGS. 1-4, in FIGS. 5-8 and in FIG. 9.

Attention is invited to the embodiment of the step bit 20 shown in FIGS. 1-4.

A distal end of the step bit 20 is shown at reference numeral 20a; a proximal end of the step bit 20 is shown at reference numeral 20b and a length of the step bit 20 is defined therebetween. A central axis 24 extends from the distal end 20a to the proximal end 20b, and the step bit 20 rotates around the central axis 24 when the proximal end 20b of the step bit 20 is connected to the power tool.

The step bit 20 includes a tip 26 extending from the distal end 20a, a body 28 extending proximally from the tip 26, and a shank 30 extending proximally from the body 28. The shank 30 is configured to be engaged with the power tool for rotation of the step bit 20 about the central axis 24.

The tip 26 has cutting edges 32 configured to form a pilot hole in the workpiece 22 and at least one tip flute 34 between the tip 26 and the body 28 which defines at least one tip section 36 between the tip 26 and the body 28. The tip sections 36 extend circumferentially around the tip 26 and define an outer diameter 27 of the tip 26. When viewed in cross-section along a plane parallel to the central axis 24, the outer surface of the tip section 36 extends generally parallel to the central axis 24. Each tip flute 34 extends from the distal end 20a to the body 28. Each tip body flute 42 includes edges 38, 40 which extend from the cutting edges 32 to the body 28. Edge 38 is a cutting edge which is also configured to form the pilot hole in the workpiece 22. In an embodiment, two tip flutes 34 and two tip sections 36 are provided, and the tip flutes 34 are disposed on diametrically opposed sides of the central axis 24. In some embodiments, the tip 26 has tip sections 36 alternating with tip flutes 34 around a circumference of the step bit 20, such that the tip sections 36 extend partially around the circumference and the tip flutes 34 extend partially around the circumference. While two tip flutes 34 and tip sections 36 are shown in the drawings, a single tip flute 34 and tip section 36 may be provided, or more than two tip flutes 34 and tip sections 36 may be provided. In an embodiment, the tip 26 has an outer diameter 27, see FIG. 3, of 0.188 inches. In an embodiment, the tip 26 has a length 29, see FIG. 2, of 0.166 inches which is defined between the distal end 20a of the step bit 20 and the body 28.

The body 28 defines at least one body flute 42 between the tip 26 and the shank 30 and at least one body section 44 between the tip 26 and the shank 30. In an embodiment, two body flutes 42 and two body sections 44 are provided, and the body flutes 42 are disposed on diametrically opposed sides of the central axis 24. In some embodiments, the body 28 has body sections 44 alternating with body flutes 42 around a circumference of the step bit 20, such that the body sections 44 extend partially around the circumference and the body flutes 42 extend partially around the circumference. While two body flutes 42 and body sections 44 are shown in the drawings, a single body flute 42 and body section 44 may be provided, or more than two body flutes 42 and body sections 44 may be provided. Each body flute 42 extends from the tip 26 to the shank 30. Each body flute 42 includes edges 46, 48 which extend from the tip 26 to the shank 30. Edge 48 is a cutting edge and aligns with cutting edge 38. In an embodiment, each body flute 42 includes surfaces 50, 52 which meet at a meeting line 53. Surface 50 extends from edge 46 to the meeting line 53, and surface 52 extends from edge 48 to the meeting line 53. In an embodiment, the surfaces 50, 52 form a generally V-shaped channel. In an embodiment, the surface 50 is planar, and the surface 52 has an inner section 52a which is curved and an outer section 52b which is planar. In some embodiments, the body flutes 42 are generally parallel to the central axis 24. In some embodiments, the body flutes 42 are helical.

Each body section 44 has a plurality of axially stacked, progressively sized steps 54a-54k between the tip 26 and the shank 30. The steps include a first step 54a extending from the tip 26, and a terminal step 54k coupled to the shank 30. The steps 54a-54k are axially stacked in that the steps 54a-54k are coaxially arranged along the central axis 24. The steps 54a-54k increase in diameter from the distal end 20a of the step bit 20 to the proximal end 20b of the 20b step bit 20. It will be appreciated that steps 54a-54k are illustrated by way of example and not by way of limitation, and that in various embodiments, a body section 44 may include additional or fewer steps and/or steps having different respective lengths (as discussed herein) and/or diameters (as discussed herein) in various embodiments.

In some embodiments, each step 54a-54k includes a first land 56a-56k and a second land 58a-58k. The second land 58a-58k extends proximally from the first land 56a-56k. In adjacent pairs of the steps 54a-54k, the first land of the step, for example land 56i of step 54i, which is positioned distally in the adjacent steps, extends distally from the second land of the step, for example second land 58h of step 54h, which is positioned proximally in the adjacent steps.

The first land 56a-56k of each step 54a-54k includes a corner surface 60, a distal surface 62 which extends proximally from the corner surface 60, and a proximal surface 64 which extends proximally from the distal surface 62.

The corner surface 60 of each first land 56a-56k has a distal end 60a and a proximal end 60b and extends circumferentially around the step bit 20 along the body section 44. In some embodiments, the corner surface 60 is radiused when viewed in cross-section along a plane parallel to the central axis 24.

The distal surface 62 of each first land 56a-56k has a distal end 62a and a proximal end 62b and extends circumferentially around the step bit 20 along the body section 44. The distal end 62a of the distal surface 62 extends proximally from the proximal end 60b of the corner surface 60. In some embodiments, when viewed in cross-section along a plane parallel to the central axis 24, the distal surface 62 is linear and is angled relative to the central axis 24 at an angle of approximately 45 degrees which is measured between the distal surface 62 and a plane extending perpendicular to the central axis 24.

The proximal surface 64 of each first land 56a-56k has a distal end 64a and a proximal end 64b and extends circumferentially around the step bit 20 along the body section 44. The distal end 64a of the proximal surface 64 extends from the proximal end 60b of the distal surface 62. When viewed in cross-section along a plane parallel to the central axis 24, the proximal surface 64 extends generally parallel to the central axis 24. The proximal surface 64 defines an outer diameter 66a-66k, see FIG. 3, of the first lands 56a-56k. The outer diameters 66a-66k of the first lands 56a-56k increase in diameter from the first step 54a to the penultimate step 54k. In some embodiments, the proximal surface 64 of the first land 56a-56k of the first step 54a has an outer diameter 66a of 0.188 inches and the proximal surface 64 of the terminal step 54k has an outer diameter 66k of 0.813 inches. In some embodiments, the distal end 64a of the proximal surface 64 is relieved by an axial relief as is known in the art. In some embodiments, the axial reliefs of the first lands 56a-56k increase in size from the first step 54a proximally. In some embodiments, the axial relief of the first lands 56a-56k increase in size from the first step 54a to the terminal step 54k, but some of the first lands are defined by the same axial relief. As an example, the first step 54a has an axial relief of 0.0167 inches and the terminal step 54k has an axial relief of 0.0040 inches. In some embodiments, the first lands 56a-56k are not relieved. In some embodiments, the proximal surface 64 is defined by a diametral relief as is known in the art. In some embodiments, the diametral relief is defined by an angle of approximately 1 degree, 0 degrees, or −1 degrees. In some embodiments, the distal surface 62 is angled an angle of approximately 45 degrees relative to the proximal surface 64.

Figure 4:
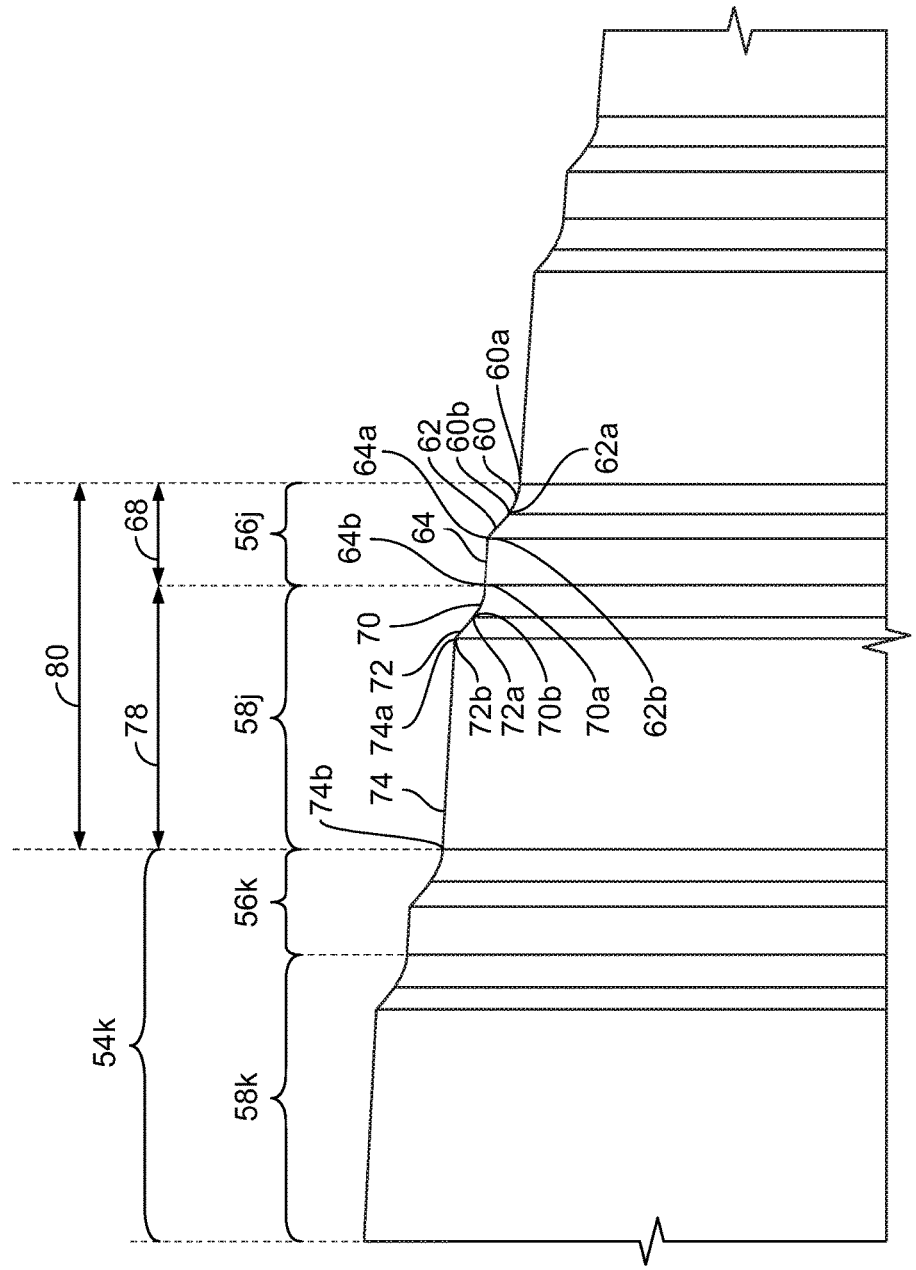
FIG. 4 is an enlarged partial side elevation view of the step bit.
Figure 5:
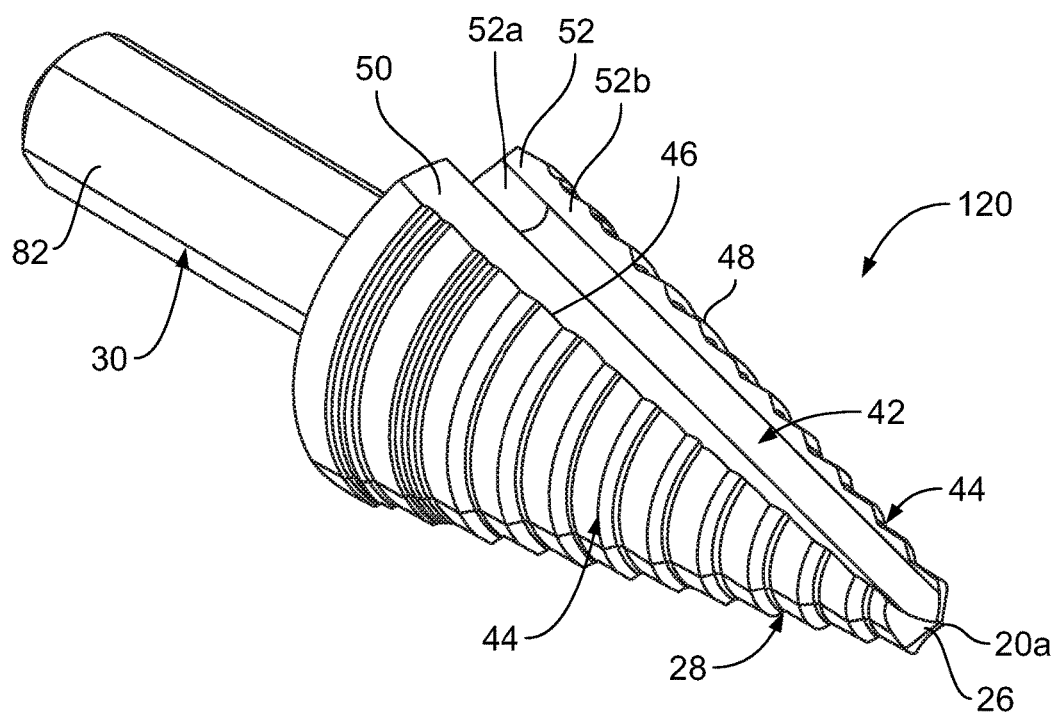
FIG. 5 is a perspective view of a step bit in accordance with an alternate embodiment of the disclosure.
Figure 6:
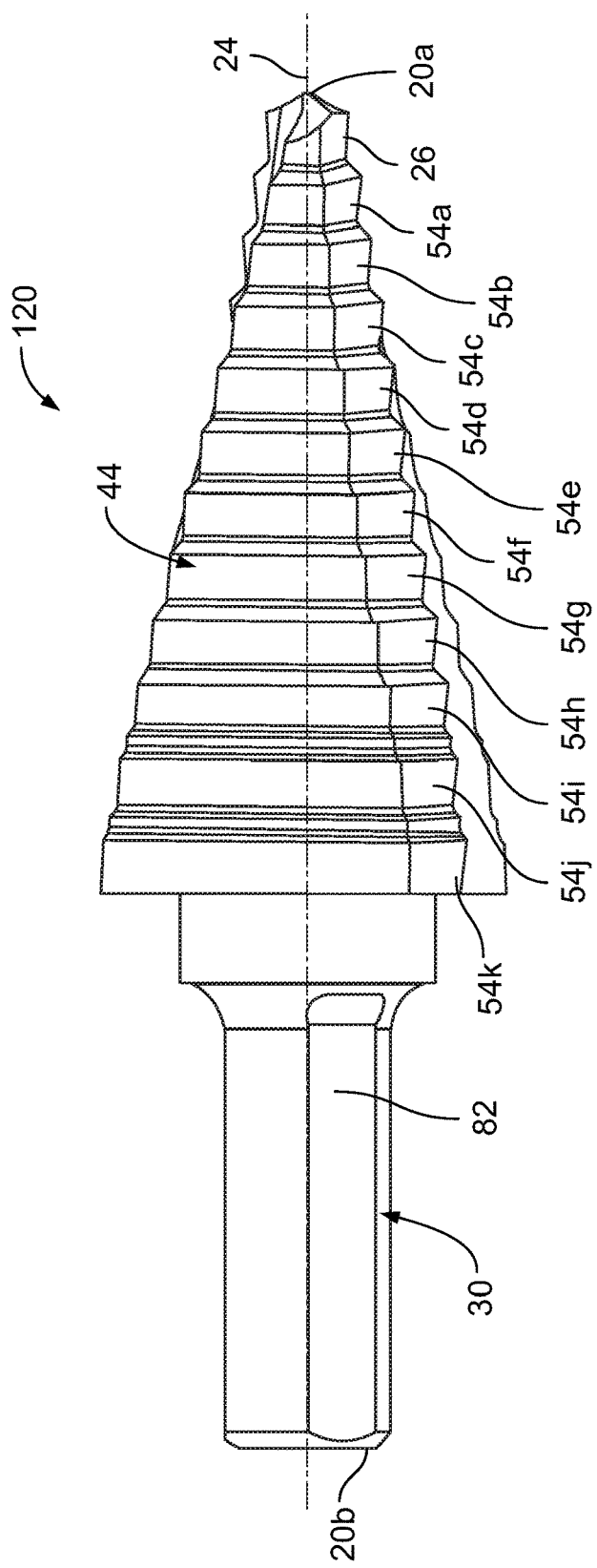
FIG. 6 is a side elevation view of the step bit of FIG. 5.
Figure 7:
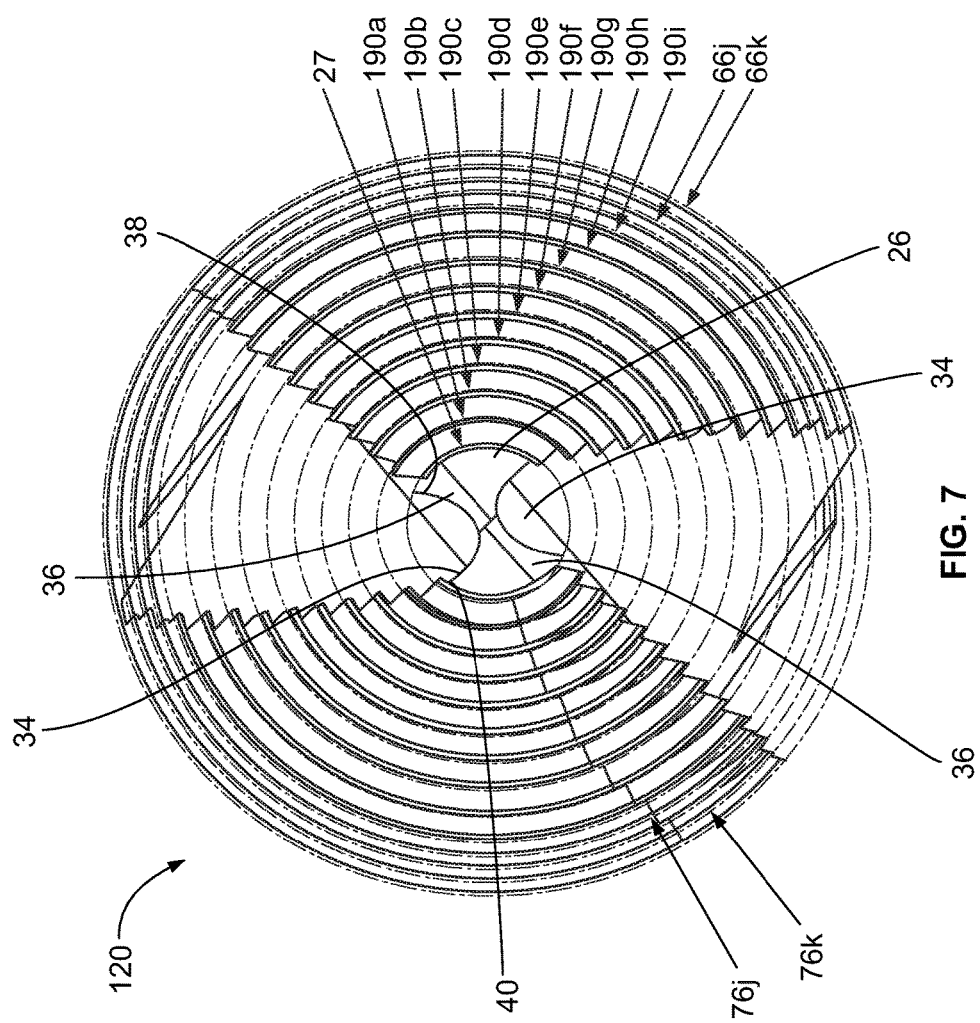
FIG. 7 is an end elevation view of the step bit of FIG. 5, looking at the step bit from the distal end.

A length 68, see FIG. 4, of each first land 56a-56k is defined between the distal end 60a of the corner surface 60 and the proximal end 64b of the proximal surface 64.

In some embodiments, one or more of the first lands 56a-56k has a radial relief. In some embodiments, the radial relief is 0.007 inches.

The second land 58a-58k of each step 54a-54k includes corner surface 70, a distal surface 72 which extends proximally from the corner surface 70, and a proximal surface 74 which extends proximally from the distal surface 72.

The corner surface 70 of each second land 58a-58k has a distal end 70a and a proximal end 70b and extends circumferentially around the step bit 20 along the body section 44. In some embodiments, the corner surface 70 is radiused when viewed in cross-section along a plane parallel to the central axis 24.

The distal surface 72 of each second land 58a-58k has a distal end 72a and a proximal end 72b and extends circumferentially around the step bit 20 along the body section 44. The distal end 72a of the distal surface 72 extends proximally from the proximal end 70b of the corner surface 70. In some embodiments, when viewed in cross-section along a plane parallel to the central axis 24, the distal surface 72 is linear and is angled relative to the central axis 24 at an angle of approximately 45 degrees which is measured between the distal surface 72 and a plane extending perpendicular to the central axis 24.

The proximal surface 74 of each second land 58a-58k has a distal end 74a and a proximal end 74b and extends circumferentially around the step bit 20 along the body section 44. The distal end 74a of the proximal surface 74 extends from the proximal end 70b of the distal surface 72. When viewed in cross-section along a plane parallel to the central axis 24, the proximal surface 74 extends generally parallel to the central axis 24. The proximal surface 74 defines an outer diameter 76a-76k, see FIG. 3, of the second lands 58a-58k. The outer diameters 76a-76k of the second lands 58a-58k increase in diameter from the first step 54a to the step 54k. In some embodiments, the proximal surface 74 of the second land 58a-58k of the first step 54a has an outer diameter 66a of 0.250 inches and the proximal surface 74 of the terminal step 54k has an outer diameter 76k of 0.875 inches. In some embodiments, the distal end 74a of the proximal surface 74 is relieved by an axial relief as is known in the art. In some embodiments, the axial reliefs of the second lands 58a-58k increase in size from the first step 54a proximally. In some embodiments, the axial relief of the second lands 58a-58k increase in size from the first step 54a to the terminal step 54k, but some of the first lands are defined by the same axial relief. As an example, the second land 58a of the first step 54a has an axial relief of 0.0167 inches and the second land 58k of the terminal step 54k has an axial relief of 0.0040 inches. In some embodiments, the second lands 58a-58k are not relieved. In some embodiments, the proximal surface 74 is defined by a diametral relief as is known in the art. In some embodiments, the diametral relief is defined by an angle of approximately 1 degree, 0 degrees, or −1 degrees. In some embodiments, the distal surface 72 is angled an angle of approximately 45 degrees relative to the proximal surface 74. The distal end 70a of the corner surface 70 extends proximally from the proximal end 64b of the proximal surface 64 of the previous step for all steps 54a-54j. The outer diameter 66a-66k of the first land 56a-56k in each step 54a-54k is less than the outer diameter 76a-76k in each step 54a-54k. The outer diameter 66a of the first step 54a is greater than the outer diameter 27 of the tip 26.

A length 78, see FIG. 4, of each second land 58a-58k is defined between the distal end 70a of the corner surface 70 and the proximal end 74b of the proximal surface 74.

In some embodiments, one or more of the second land 58a-58k has a radial relief. In some embodiments, the radial relief is 0.007 inches.

The lengths 68 and 78 of the respective lands 56a-56k and 58a-58k are combined to define a total length 80, see FIG. 4 of the respective step 54a-54k. In some embodiments, the total lengths 80 are the same.

In an embodiment, each total length 80 is 0.167 inches, each length 68 is 0.046 inches, and each length 78 is 0.120 inches.

In some embodiments, the length 29 of the tip 26 is about the same as or greater than the length 78 of the second lands 58a-58k.

In each step 54a-54k, the length 68 of the first land 56a-56k is less than the length 78 of the second land 58a-58k. In some embodiments, the length 78 of the second land 58a-58k is approximately three times as long as the length 68 of the first land 56a-56k. In some embodiments, the length 68 of the first land 56a-56k is approximately 28% of the total length 80 of the respective step 54a-54k, and the length 78 of the second land 58a-58k is approximately 72% of the total length 80 of the respective step 54a-54k. In an embodiment, the total length 80 of the respective step 54a-54k is 0.167 inches, the length 68 of the first land 56a-56k is 0.046 inches, and the length 78 of the second land 58a-58k is 0.121 inches. In some embodiments, the total lengths 80 of the steps 54a-54k varies, but the length 68 of the first land 56a-56k is less than the length 78 of the second land 58a-58k. In addition, the length 68 of the first land 56a-56k is less than the maximum thickness T1 of the workpiece 22, and the length of the second land 58a-58k is greater than the maximum thickness T1 of the workpiece 22.

In an embodiment, the length 78 of the second land 58a-58k is approximately 155%±15% of the maximum thickness T1 of the workpiece 22, and the length 68 of the first land 56a-56k is approximately 59%±15% of the maximum thickness T1 of the workpiece 22.

In some embodiments, the outer diameter 66a-66k of the first land 56a-56k is 11% to 15% less than the outer diameter 76a-76k of the second land 58a-58k of the respective step 54a-54k. In an embodiment, the outer diameter 66a-66k of the first land 56a-56k is 13% less than the outer diameter 76a-76k of the second land 58a-58k of the respective step 54a-54k.

The shank 30 extends from the terminal step 54k. In an embodiment, flats 82 are provided on the shank 30 and provide driving surfaces for rotation of the step bit 20 when mounted within the chuck of the power tool.

To use the step bit 20, the user begins by engaging the shank 30 within the chuck of the power tool. The user then engages the tip 26 with the proximal surface 22b of the workpiece 22 and the step bit 20 is rotated by the power tool. The tip 26 punctures the proximal surface 22b of the workpiece 22 and the cutting edges 32, 38 form a pilot hole through the workpiece 22 as the tip 26 is inserted through the workpiece 22 from the proximal surface 22b of the workpiece 22 to the distal surface 22a of the workpiece 22. Thereafter, the first step 54a engages with the proximal surface 22b of the workpiece 22. When the cutting edge 48 of the first land 56a of the first step 54a engages with the hole in the workpiece 22, a predetermined amount of the material of the workpiece 22 is removed as a chip. Since the first land 56a has a length 68 which is less than the maximum thickness T1 of the workpiece 22, the first land 56a does not exit the distal surface 22a of the workpiece 22 before the second land 58a of the first step 54a engages with the proximal surface 22b of the workpiece 22. Therefore, as the first land 56a of the first step 54a translates through the workpiece 22 from the proximal surface 22b to the distal surface 22a, the second land 58a of the first step 54a engages with and cuts the workpiece 22 before the first land 56a of the first step 54a completely exits the workpiece 22. When the cutting edge 48 of the second land 58a of the first step 54a engages with the hole, the hole is further enlarged since the second land 58a of the first step 54a has a larger diameter 76a than the diameter 66a of the first land 56a of the first step 54a. Therefore, a further amount of material of the workpiece 22 is removed as a chip by the second land 58a of the first step 54a. The second land 58a of the first step 54a has a length 78 which is greater than the maximum thickness T1 of the workpiece 22 and therefore exits the distal surface 22a of the workpiece 22 prior to engagement of the second step 54b. When the cutting edge 48 of the first land 56b of the second step 54b engages with the hole, the hole is enlarged since the first land 56b of the second step 54b has a larger diameter 66b than the diameter 76a of the second land 58a of the first step 54a. Therefore, a further amount of material of the workpiece 22 is removed as a chip by the first land 56b of the second step 54b. Again, since the first land 56b of the second step 54b has a length 68 which is less than the maximum thickness T1 of the workpiece 22, the first land 56b does not exit the distal surface 22a of the workpiece 22 before the second land 58b of the second step 54b engages with the proximal surface 22b of the workpiece 22. Therefore, as the first land 56b of the second step 54b translates through the workpiece 22 from the proximal surface 22b to the distal surface 22a, the second land 58b of the second step 54b engages with and cuts the workpiece 22 before the first land 56b of the second step 54b completely exits the workpiece 22. When the cutting edge 48 of the second land 58*b* of the second step 54*b* engages with the hole, the hole is enlarged since the diameter 76*b* of the second land 58*b* of the second step 54*b* is larger than the diameter 66*b* of the first land 56*b* of the second step 54*b*. Therefore, a further amount of material of the workpiece 22 is removed as a chip by the second land 58*b* of the second step 54*b*. This is repeated for each of the remaining steps 54*c*-54*k* until the hole in the workpiece 22 is enlarged to its final desired size.

The step bit 20 reduces cutting torque by use of the first and second lands 56*a*-56*k*, 58*a*-58*k*. Since material is removed from the workpiece 22 by smaller preceding steps 54*a*-54*k*. The hole enlargement reduces the nominal step material removal and thereby reduces the chip size generated at steps 54*a*-54*k*. In this process, the hole opening on the proximal surface 22*b* of the workpiece 22 has been enlarged is diameter progressively. By removing the volume of workpiece material hole prior to the larger diameter steps, for example steps 54*i* and 54*k*, stalling of the power tool is minimized. This allows for the increase in cutting speed of the power tool. The step bit 20 also reduces the shock of drilling from one step diameter size to the next step diameter size as the step bit 20 enters the workpiece 22.

In some embodiments, the amount of material volume removed ranges from approximately 16% to 20% volume at the transition of the diameter 27 of the tip 26 to the first step 54*a*, and the amount of material volume removed ranges from 6% to 14% volume over the next steps 54*b*-54*k*. In an embodiment, the amount of material volume removed is 18% volume at the transition of the diameter 27 of the tip 26 to the first step 54*a*, and the amount of material volume removed is 10% volume over the next steps 54*b*-54*k*.

While eleven steps 54*a*-54*k* are shown in the drawings, more or fewer than eleven steps 54*a*-54*k* can be provided.

Attention is invited to the embodiment of the step bit 120 shown in FIGS. 5-8. The step bit 120 is identical to the step bit 20 of FIGS. 1-4, except for the differences noted herein. Therefore, the specifics of the identical elements are not repeated herein. The step bit 120 differs from the step bit 20 in that not all of the steps 54*a*-54*k* have the first and second lands 56*a*-56*k* and 58*a*-58*k*. Instead, as shown, the largest diameter steps 54*j* and 54*k* have first and second lands 56*j*, 56*k*, 58*j*, 58*k*, but the remainder of the steps 54*a*-54*i* only have a single land 182.

The land 182 of each step 54*a*-54*i* includes a corner surface 184, a distal surface 186 which extends proximally from the corner surface 184, and a proximal surface 188 which extends proximally from the distal surface 186.

The corner surface 184 of each land 182 has a distal end 184*a* and a proximal end 184*b* and extends circumferentially around the step bit 20 along the body section 44. In some embodiments, the corner surface 184 is radiused when viewed in cross-section along a plane parallel to the central axis 24.

The distal surface 186 of each land 182 has a distal end 186*a* and a proximal end 186*b* and extends circumferentially around the step bit 20 along the body section 44. The distal end 186*a* of the distal surface 186 extends proximally from the proximal end 184*b* of the corner surface 184. In some embodiments, when viewed in cross-section along a plane parallel to the central axis 24, the distal surface 186 is linear and is angled relative to the central axis 24 at an angle of approximately 45 degrees which is measured between the distal surface 186 and a plane extending perpendicular to the central axis 24.

The proximal surface 188 of each land 182 has a distal end 188*a* and a proximal end 188*b* and extends circumferentially around the step bit 20 along the body section 44. The distal end 188*a* of the proximal surface 188 extends from the proximal end 184*b* of the distal surface 186. When viewed in cross-section along a plane parallel to the central axis 24, the proximal surface 188 extends generally parallel to the central axis 24. The proximal surface 188 defines an outer diameter 190*a*-190*i*, see FIG. 7, of the lands 182. The outer diameters 190*a*-190*i* of the steps 54*a*-54*i* increase in diameter from the first step 54*a* to the step 54*i*. In some embodiments, the proximal surface 188 of the land 182 of the first step 54*a* has an outer diameter 66*a* of 0.250 inches and the proximal surface 188 of the step 54*i* has an outer diameter 190*i* of 0.750 inches. In some embodiments, the distal end 188*a* of the proximal surface 188 is relieved by an axial relief as is known in the art. In some embodiments, the axial reliefs of the steps 54*a*-54*i* increase in size from the first step 54*a* proximally to step 54*i*. In some embodiments, the axial relief of the steps 54*a*-54*i* increase in size from the first step 54*a* to the step 54*i*, but some of the steps 54*a*-54*i* are defined by the same axial relief. As an example, the first step 54*a* has an axial relief of 0.0167 inches and the terminal step 54*i* has an axial relief of 0.0048 inches. In some embodiments, the steps 54*a*-54*i* are not relieved. In some embodiments, the proximal surface 188 of the steps 54*a*-54*i* is defined by a diametral relief as is known in the art. In some embodiments, the diametral relief is defined by an angle of approximately 1 degree, 0 degrees, or −1 degrees. In some embodiments, the distal surface 186 is angled an angle of approximately 45 degrees relative to the proximal surface 188.

A length 192, see FIG. 8, of each land 182 is defined between the distal end 184*a* of the corner surface 184 and the proximal end 188*b* of the proximal surface 188.

In some embodiments, one or more of the lands 182 has a radial relief. In some embodiments, the radial relief is 0.007 inches.

Therefore, in the step bit 120, the steps 54*i* and 54*k* having the first and second lands 56*j*, 56*k*, 58*j*, 58*k* are the steps which are proximate to the distal end of the body 28. These steps 54*j* and 54*k* are the larger steps wherein the power tool is most likely to stall when the steps are encountered.

The length 192 of each step 54*a*-54*i* is greater than the maximum thickness T1 of the workpiece 22. The length 192 of the steps 54*a*-54*i* are less than the length of the steps 54*j* and 54*k*. In an embodiment, the length 192 of the steps 54*a*-54*i* is approximately 0.136 inches. The length 192 of the steps 54*a*-54*i* having the single land 182 is about the same as or greater than the length 78 of the second lands 58*j*, 58*k* of the steps 54*j*, 54*k*. In some embodiments, the length 29 of the tip 26 is about the same as or greater than the length 192 of the steps 54*a*-54*i* and the lengths 78 of the second lands 58*j*, 58*k* of the steps 54*j*, 54*k*.

To use the step bit 120, the user begins by engaging the shank 128 within the chuck of the power tool. The user then engages the tip 130 with the proximal surface 22*b* of the workpiece 22 and the step bit 120 is rotated by the power tool. The tip 26 punctures the proximal surface 22*b* of the workpiece 22 and the cutting edges 32, 38 form a pilot hole through the workpiece 22 as the tip 26 is inserted through the workpiece 22 from the proximal surface 22*b* of the workpiece 22 to the distal surface 22*a* of the workpiece 22. Thereafter, the first step 54*a* engages with the proximal surface 22*b* of the workpiece 22. When the cutting edge 48 of the first step 54*a* engages with the hole in the workpiece 22, a predetermined amount of the material of the workpiece 22 is removed as a chip. Since the first step 54*a* has a length 192 which is greater than the maximum thickness T1 of the workpiece 22, the first step 54a exits the distal surface 22a of the workpiece 22 before the second step 54b engages with the proximal surface 22b of the workpiece 22. When the cutting edge 48 of the second step 54b engages with the hole, the hole is enlarged since the second step 54b has a larger diameter 190b than the diameter 190a of the first step 54a. Therefore, a further amount of material of the workpiece 22 is removed as a chip by the second step 540b. This repeats through step 54i.

When step 54j engages with the proximal surface 22b of the workpiece 22, the cutting edge 48 of the first land 56j of the step 54j engages with the hole in the workpiece 22 and a predetermined amount of the material of the workpiece 22 is removed as a chip. When the cutting edge 48 of the first land 56j of the step 54j engages with the hole, the hole is further enlarged since the first land 56j of the step 54j has a larger diameter 66j than the diameter 190i of the step 54i. Since the first land 56j has a length 68 which is less than the maximum thickness T1 of the workpiece 22, the first land 56j does not exit the distal surface 22a of the workpiece 22 before the second land 58j of the step 54j engages with the proximal surface 22b of the workpiece 22. Therefore, as the first land 56j of the step 54j translates through the workpiece 22 from the proximal surface 22b to the distal surface 22a, the second land 58j of the step 54j engages with and cuts the workpiece 22 before the first land 56j of the step 54j completely exits the workpiece 22. A further amount of material of the workpiece 22 is removed as a chip by the second land 58j of the step 54j. The second land 58j of the step 54j has a length 78 which is greater than the maximum thickness T1 of the workpiece 22 and therefore exits the distal surface 22a of the workpiece 22 prior to engagement of the terminal step 54k. When the cutting edge 48 of the first land 56k of the terminal step 54k engages with the hole, the hole is enlarged since the first land 56b of the second step 54b has a larger diameter 66b than the diameter 76a of the second land 58k of the step 54k. Therefore, a further amount of material of the workpiece 22 is removed as a chip by the first land 56k of the terminal step 54k. Again, since the first land 56k of the terminal step 54k has a length 68 which is less than the maximum thickness T1 of the workpiece 22, the first land 56k does not exit the distal end 22a of the workpiece 22 before the second land 58k of the terminal step 54k engages with the proximal surface 22b of the workpiece 22. Therefore, as the first land 56k of the terminal step 54k translates through the workpiece 22 from the proximal surface 22b to the distal surface 22a, the second land 58k of the terminal step 54k engages with and cuts the workpiece 22 before the first land 56k of the terminal step 54k completely exits the workpiece 22. When the cutting edge 48 of the second land 58k of the terminal step 54k engages with the hole, the hole is enlarged since the diameter 76k of the second land 58k of the terminal step 54k is larger than the diameter 66b of the first land 56k of the terminal step 54k. Therefore, a further amount of material of the workpiece 22 is removed as a chip by the second land 58k of the terminal step 54k and the hole in the workpiece 22 is enlarged to its final desired size.

While steps 154j and 154k are shown as having the two lands in FIGS. 5-8, more than these two steps 154j, 154k may have first and second lands.

While FIGS. 1-4 show all of the steps 54a-54k having first and second lands 56a-56k and 58a-58k, and while FIGS. 5-8 show the last two steps 54j, 54k having first and second lands 56j, 56k and 58j, 58k, it is to be understood that only the terminal step 54k may have the first and second lands 56k, 58k.

While FIGS. 1-4 show all of the steps 54a-54k having first and second lands 56a-56k and 58a-58k, and while FIGS. 5-8 show only the last two steps 54j, 54k having first and second lands 56j, 56k and 58j, 58k, it is to be understood that any one of the steps 54a-54k may have the first and second lands, that only one of the steps 54a-54k may have the first and second lands, that any number of the steps 54a-54k may have the first and second lands, that multiple ones of the steps 54a-54k may have the first and second lands, and steps have the first and second lands may not be consecutive.

FIG. 9 illustrates a step bit 220 which has only the penultimate step 54j having the first and second lands 56j, 58j, while the remaining steps 54a-i and 54k have the single land 182; otherwise step bit 220 is identical to the step bit 120 of FIGS. 5-8. Therefore, the specifics of the identical elements are not repeated herein.

While dimensions for various aspects of the step bit 20, 120, 220 are described, it is to be understood that other dimensions can be used without departing from the scope of the invention.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A step bit comprising:
a distal end and a proximal end, and a central axis defined between the distal and proximal ends around which the step bit is configured to be rotated;
a tip provided at the distal end, the tip including one or more cutting edges;
a body extending from the tip, the body including one or more flutes having a cutting edge,
a plurality of steps provided on the body from the tip to the proximal end, each step having a first land and a second land extending proximally from the first land, each first land having a length and a surface defining an outer diameter, each second land having a length and a surface defining an outer diameter, wherein in each step the outer diameter of the first land is less than the outer diameter of the second land, the lands progressively increasing in outer diameter as the steps progress from a first step at the distal end to a terminal step at a proximal end of the body, wherein in each step the length of the first land is less than the length of the second land, wherein the length of each first land is the same, and wherein the length of each second land is the same; and
a shank extending proximally from the body.

2. The step bit of claim 1, wherein the surface in each first land comprises a proximal surface, and each first land further comprises a distal surface which extends proximally from the proximal surface and is angled relative to the proximal surface, and a corner surface which extends proximally from the proximal surface.

3. The step bit of claim 1, wherein the surface in each second land comprises a proximal surface, and each second land further comprises a distal surface which extends proximally from the proximal surface and is angled relative to the proximal surface, and a corner surface which extends proximally from the proximal surface.

4. The step bit of claim 1,
wherein the surface in each first land comprises a proximal surface, and each first land further comprises a distal surface which extends proximally from the proximal surface and is angled relative to the proximal surface, and a corner surface which extends proximally from the proximal surface, and
the surface in each second land comprises a proximal surface, and each second land further comprises a distal surface which extends proximally from the proximal surface of the second land and is angled relative to the proximal surface of the second land, and a corner surface which extends proximally from the proximal surface of the second land.

5. A step bit comprising:
a distal end and a proximal end, and a central axis defined between the distal and proximal ends around which the step bit is configured to be rotated;
a tip provided at the distal end, the tip including one or more cutting edges;
a body extending from the tip, the body including one or more flutes having a cutting edge,
a plurality of steps provided on the body, each step having a first land and a second land extending proximally from the first land, each first land having a length and a surface defining an outer diameter, each second land having a length and a surface defining an outer diameter, wherein in each step the outer diameter of the first land is less than the outer diameter of the second land, the lands progressively increasing in outer diameter as the steps progress from a first step at the distal end to a terminal step at a proximal end of the body, wherein in each step the length of the first land is less than the length of the second land;
a shank extending proximally from the body; and
wherein the surface in each first land comprises a proximal surface, and each first land further comprises a distal surface which extends proximally from the proximal surface and is angled relative to the proximal surface, and a corner surface which extends proximally from the proximal surface, and
wherein the surface in each second land comprises a proximal surface, and each second land further comprises a distal surface which extends proximally from the proximal surface of the second land and is angled relative to the proximal surface of the second land, and a corner surface which extends proximally from the proximal surface of the second land, and
wherein in one or more of the steps, the proximal surface of the first land is angled at an angle of approximately 45 degrees relative to the distal surface of the first land, and the proximal surface of the second land is angled at an angle of approximately 45 degrees relative to the distal surface of the second land.

6. A step bit comprising:
a distal end and a proximal end, and a central axis defined between the distal and proximal ends around which the step bit is configured to be rotated;
a tip provided at the distal end, the tip including one or more cutting edges;
a body extending from the tip, the body including one or more flutes having a cutting edge,
a plurality of steps provided on the body, each step having a first land and a second land extending proximally from the first land, each first land having a length and a surface defining an outer diameter, each second land having a length and a surface defining an outer diameter, wherein in each step the outer diameter of the first land is less than the outer diameter of the second land, the lands progressively increasing in outer diameter as the steps progress from a first step at the distal end to a terminal step at a proximal end of the body, wherein in each step the length of the first land is less than the length of the second land;
a shank extending proximally from the body; and
wherein the surface in each first land comprises a proximal surface, and each first land further comprises a distal surface which extends proximally from the proximal surface and is angled relative to the proximal surface, and a corner surface which extends proximally from the proximal surface, and
wherein the surface in each second land comprises a proximal surface, and each second land further comprises a distal surface which extends proximally from the proximal surface of the second land and is angled relative to the proximal surface of the second land, and a corner surface which extends proximally from the proximal surface of the second land, and
wherein the surface in each first land comprises a proximal surface, and each first land further comprises a distal surface which extends proximally from the proximal surface and is angled relative to the proximal surface, and a corner surface which extends proximally from the proximal surface, and
the surface in each second land comprises a proximal surface, and each second land further comprises a distal surface which extends proximally from the proximal surface of the second land and is angled relative to the proximal surface of the second land, and a corner surface which extends proximally from the proximal surface of the second land;
wherein in one or more of the steps, each corner surface is radiused.

7. A step bit comprising:
a distal end and a proximal end, and a central axis defined between the distal and proximal ends around which the step bit is configured to be rotated;
a tip provided at the distal end, the tip including one or more cutting edges;
a body extending from the tip, the body including one or more flutes having a cutting edge,
a plurality of steps provided on the body, each step having a first land and a second land extending proximally from the first land, each first land having a length and a surface defining an outer diameter, each second land having a length and a surface defining an outer diameter, wherein in each step the outer diameter of the first land is less than the outer diameter of the second land, the lands progressively increasing in outer diameter as the steps progress from a first step at the distal end to a terminal step at a proximal end of the body, wherein in each step the length of the first land is less than the length of the second land;

a shank extending proximally from the body; and wherein in two or more of the steps, the outer diameter of the second land is greater than the outer diameter of the respective first land by the same amount.

8. The step bit of claim 1, the step bit being configured to cut a workpiece having a maximum thickness, wherein the length of each first land is less than the maximum thickness of the workpiece, and the length of each second land is greater than the maximum thickness of the workpiece.

9. The step bit of claim 8, wherein the length of each first land is approximately 59%±15% of the maximum thickness of the workpiece, and the length of each second land is approximately 155%±15% of the maximum thickness of the workpiece.

10. The step bit of claim 1, the step bit being configured to cut a workpiece having a maximum thickness, wherein the combined lengths of the first and second lands greater than the maximum thickness of the workpiece.

11. The step bit of claim 1, wherein in each step, the length of the second land is approximately three times as long as the length of the first land.

12. A step bit comprising:

a distal end and a proximal end, and a central axis defined between the distal and proximal ends around which the step bit is configured to be rotated;

a tip provided at the distal end, the tip including one or more cutting edges;

a body extending from the tip, the body including one or more flutes having a cutting edge, a plurality of steps provided on the body, one or more of the steps having a first land and a second land extending proximally from the first land, each first land having a length and a surface defining an outer diameter, each second land having a length and a surface and defining an outer diameter, and one or more of the steps having a single land, each single land having a length and a surface and defining an outer diameter, the lands progressively increasing in outer diameter as the steps progress from a first step at the distal end to a terminal step at a proximal end of the body, wherein in each step having first and second lands, the outer diameter of the first land is less than the outer diameter of the second land, wherein in each step having first and second lands, the length of the first land is less than the length of the second land, wherein in each step having a single land, the length of the single land is substantially the same as the length of the second lands of the steps having first and second lands; and a shank extending proximally from the body.

13. The step bit of claim 12, wherein only the terminal step and the penultimate step are comprised of the first and second lands.

14. The step bit of claim 12, wherein the surface in each first land comprises a proximal surface, and each first land further comprises a distal surface which extends proximally from the proximal surface and is angled relative to the proximal surface, and a corner surface which extends proximally from the proximal surface.

15. The step bit of claim 12, wherein the surface in each second land comprises a proximal surface, and each second land further comprises a distal surface which extends proximally from the proximal surface and is angled relative to the proximal surface, and a corner surface which extends proximally from the proximal surface.

16. The step bit of claim 12, wherein in each single land, the surface comprises a proximal surface, and each single land further comprises a distal surface which extends proximally from the proximal surface and is angled relative to the proximal surface, and a corner surface which extends proximally from the proximal surface.

17. The step bit of claim 12, wherein the surface in each first land comprises a proximal surface, and each first land further comprises a distal surface which extends proximally from the proximal surface and is angled relative to the proximal surface, and a corner surface which extends proximally from the proximal surface, the surface in each second land comprises a proximal surface, and each second land further comprises a distal surface which extends proximally from the proximal surface of the second land and is angled relative to the proximal surface of the second land, and a corner surface which extends proximally from the proximal surface of the second land, and the surface in each single land comprises a proximal surface, and each single land further comprises a distal surface which extends proximally from the proximal surface and is angled relative to the proximal surface, and a corner surface which extends proximally from the proximal surface.

18. The step bit of claim 12, wherein in each step having first and second lands, the outer diameter of the second land is greater than the outer diameter of the respective first land by the same amount.

19. The step bit of claim 12, the step bit being configured to cut a workpiece having a maximum thickness, wherein the length of each first land is less than the maximum thickness of the workpiece, the length of each second land is greater than the maximum thickness of the workpiece, and the length of each single land is greater than the maximum thickness of the workpiece.

20. The step bit of claim 19, wherein the length of each first land is approximately 59%±15% of the maximum thickness of the workpiece, and the length of each second land is approximately 155%±15% of the maximum thickness of the workpiece.

21. The step bit of claim 12, the step bit being configured to cut a workpiece having a maximum thickness, wherein the combined lengths of the first and second lands is greater than the maximum thickness of the workpiece.

22. The step bit of claim 12, wherein in each step having first and second lands, a total length is defined as the sum of the length of the first land and the length of the second land, and wherein the total length is equal in two or more of the steps having first and second lands.

23. The step bit of claim 12, wherein in each step having first and second lands, the length of the second land is approximately three times as long as the length of the first land.

24. The step bit of claim 12, wherein only one of the steps is comprised of the first and second lands.

25. A step bit comprising:

a distal end and a proximal end, and a central axis defined between the distal and proximal ends around which the step bit is configured to be rotated;

a tip provided at the distal end, the tip including one or more cutting edges;

a body extending from the tip, the body including one or more flutes having a cutting edge, a plurality of steps provided on the body, one or more of the steps having a first land and a second land extending proximally from the first land, each first land having a length and a surface defining an outer diameter, each second land having a length and a surface and defining an outer diameter, and one or more of the steps having a single land, each single land having a length and a surface and defining an outer diameter, the lands progressively increasing in outer diameter as the steps progress from a first step at the distal end to a terminal step at a proximal end of the body, wherein in each step having first and second lands, the outer diameter of the first land is less than the outer diameter of the second land, wherein in each step having first and second lands, the length of the first land is less than the length of the second land, wherein in each step having a single land, the length of the single land is greater than the length of the second lands of the steps having first and second lands; and a shank extending proximally from the body.

26. The step bit of claim 25, wherein only the terminal step and the penultimate step are comprised of the first and second lands.

27. The step bit of claim 25, wherein the surface in each first land comprises a proximal surface, and each first land further comprises a distal surface which extends proximally from the proximal surface and is angled relative to the proximal surface, and a corner surface which extends proximally from the proximal surface.

28. The step bit of claim 25, wherein the surface in each second land comprises a proximal surface, and each second land further comprises a distal surface which extends proximally from the proximal surface and is angled relative to the proximal surface, and a corner surface which extends proximally from the proximal surface.

29. The step bit of claim 25, wherein in each single land, the surface comprises a proximal surface, and each single land further comprises a distal surface which extends proximally from the proximal surface and is angled relative to the proximal surface, and a corner surface which extends proximally from the proximal surface.

30. The step bit of claim 25, wherein the surface in each first land comprises a proximal surface, and each first land further comprises a distal surface which extends proximally from the proximal surface and is angled relative to the proximal surface, and a corner surface which extends proximally from the proximal surface, the surface in each second land comprises a proximal surface, and each second land further comprises a distal surface which extends proximally from the proximal surface of the second land and is angled relative to the proximal surface of the second land, and a corner surface which extends proximally from the proximal surface of the second land, and the surface in each single land comprises a proximal surface, and each single land further comprises a distal surface which extends proximally from the proximal surface and is angled relative to the proximal surface, and a corner surface which extends proximally from the proximal surface.

31. The step bit of claim 25, wherein in each step having first and second lands, the outer diameter of the second land is greater than the outer diameter of the respective first land by the same amount.

32. The step bit of claim 25, the step bit being configured to cut a workpiece having a maximum thickness, wherein the length of each first land is less than the maximum thickness of the workpiece, the length of each second land is greater than the maximum thickness of the workpiece, and the length of each single land is greater than the maximum thickness of the workpiece.

33. The step bit of claim 32, wherein the length of each first land is approximately 59%±15% of the maximum thickness of the workpiece, and the length of each second land is approximately 155%±15% of the maximum thickness of the workpiece.

34. The step bit of claim 25, the step bit being configured to cut a workpiece having a maximum thickness, wherein the combined lengths of the first and second lands is greater than the maximum thickness of the workpiece.

35. The step bit of claim 25, wherein in each step having first and second lands, a total length is defined as the sum of the length of the first land and the length of the second land, and wherein the total length is equal in two or more of the steps having first and second lands.

36. The step bit of claim 25, wherein in each step having first and second lands, the length of the second land is approximately three times as long as the length of the first land.

37. The step bit of claim 25, wherein only one of the steps is comprised of the first and second lands.

* * * * *

UNITED STATES PATENT AND TRADEMARK OFFICE
CERTIFICATE OF CORRECTION

PATENT NO. : 10,245,656 B2
APPLICATION NO. : 15/661118
DATED : April 2, 2019
INVENTOR(S) : Piper et al.

It is certified that error appears in the above-identified patent and that said Letters Patent is hereby corrected as shown below:

In the Claims

In Column 12, Lines 35-47, in Claim 6, delete "wherein the surface in each first land comprises a proximal surface, and each first land further comprises a distal surface which extends proximally from the proximal surface and is angled relative to the proximal surface, and a corner surface which extends proximally from the proximal surface, and the surface in each second land comprises a proximal surface, and each second land further comprises a distal surface which extends proximally from the proximal surface of the second land and is angled relative to the proximal surface of the second land, and a corner surface which extends proximally from the proximal surface of the second land;".

Signed and Sealed this
Twenty-sixth Day of December, 2023

Katherine Kelly Vidal
*Director of the United States Patent and Trademark Office*